United States Patent Office 2,794,753
Patented June 4, 1957

2,794,753

METHOD OF PRODUCING MICROPOROUS MATERIALS RESISTANT TO CHEMICAL ATTACK

Joseph C. Duddy, Langhorne, Pa., assignor to The Electric Storage Battery Company, a corporation of New Jersey No Drawing. Application August 23, 1951,
Serial No. 243,355

6 Claims. (Cl. 117—138.8)

This invention relates to microporous materials disclosed in my copending application, Serial No. 226,742, filed May 16, 1951, and now abandoned, and has for an object the provision of a method for producing a new microporous material having considerably greater resistance to chemical attack than those to which my copending application is directed.

In my copending application, and in the present application, there are many features in common with those disclosed in United States Letters Patent No. 2,542,527, issued February 20, 1951, in which a suitable thermoplastic material such as polyvinyl chloride is mixed with particles of starch, shaped into desired form, subjected to a starch-swelling step and to a starch-removal step either at elevated temperature or temperatures below that at which the resin changes from an elastic to a plastic state.

Thermoplastic resins of the polyvinyl chloride type when subjected to certain chemical reagents, such as strong acids or oxidizing environment, are attacked to a slight degree. When microporous materials of such resins are formed into storage battery separators the release of chloride ion by the chemical reactions taking place in the battery, such as the oxidizing conditions due to the presence of nascent oxygen and the like, is disadvantageous. The chloride ion is presumably converted to perchloric acid which attacks the metallic lead structure of the battery, shortening its life.

Battery separators made of polyvinyl chloride resins in the manner disclosed in said United States patent are highly desirable and superior to wood separators and when shaped into the conventional rib type of separator as used in automobile batteries, the degree of attack resulting in the release of chloride ion is so small as not to be of great consequence. However, when batteries of the tubular type are to be used in which the resinous retaining sheaths intimately contact and enclose the active material, the porosity provides not only for the flow of current but also for the exit of gases through the pores making available large areas of polyvinyl chloride in intimate contact with any nascent oxygen which may be present, thus magnifying and making of consequence the possibility of release of chloride ion with consequent resin degradation.

In accordance with the present invention, microporous materials made pursuant to the disclosure of said United States patent have been rendered substantially inert to attack by the chemical conditions existing in batteries of the sheathing-retainer type and without greatly increasing the cost of the retainers.

In carrying out the invention in one form thereof, the dry porous product, the anode sheath, is impregnated with a solution of monomeric styrene containing dissolved catalyst and wetting agent. Preferably, the impregnation is conducted at temperatures which assure little if any polymerization. The added styrene along with the dissolved catalyst and wetting agent not only imparts to the microporous material added toughness but imparts greater chemical inertness to the polyvinyl chloride in degree related to the polymerization of the styrene to polystyrene.

In the polymerization it is not now known for certain whether the polystyrene is deposited in separate phase coating the polyvinyl chloride network or whether the monomeric styrene being in liquid form is sufficiently capable of dissolving to a limited degree the polyvinyl chloride and thus reposes therewith in solid solution upon polymerization. What is known is that polymeric vinyl chloride and styrene are incompatible at normal temperatures and that polyvinyl chloride impregnated with styrene has increased resistance to chemical attack with diminution of the release of chloride ion.

More particularly, any amount of monomeric styrene used as an impregnant and subsequently polymerized enhances the resistance of the polyvinyl chloride to chemical attack. The amount of catalyst is determined by the amount of styrene used. As illustrative, and not by way of limitation, the following impregnating solution has been found satisfactory:

100 parts by weight of monomeric styrene
0.7 part by weight of benzoyl peroxide as the catalyst
1 part by weight of a wetting agent the latter an alkyl aryl polyether alcohol, available on the market under the trade-name "Triton X-100," and used to make wettable the end-product.

In carrying out the process as described above, there is produced from the thermoplastic resin, polyvinyl chloride including its copolymers and other chloride-ion-containing resins such as vinylidene chloride, a microporous material in which the polymerization of the impregnant has not been completed, but in which polymerization is induced and carried to completion by the chemical conditions prevailing in storage batteries. By so providing a product of the kind described, there is avoided embrittlement prior to the filling of the finned tubing or sheathing with the active material. Thus, during the handling of the finned tubing or sheathing it has the flexibility and strength to minimize the possibility of rupture or breakage.

At the present time after assembly in the storage battery and under normal conditions of use the residual monomeric sytrene and/or lowly polymerized styrene is converted to polystyrene to provide the maximum resistance against chemical attack. Stated differently, in use and in the presence of nascent oxygen or other reagents tending to release chloride ion by degradation of the polyvinyl chloride, the polymerization of the styrene is induced to bring about changes in properties of the whole structure to resist and prevent release of chloride ion.

It is, of course, to be understood that the polymerization need not take place under conditions of use in the storage battery but after assembly of the plate or electrode is completed, the impregnated sheathing can be subject to polymerization conditions such as by applying actinic light and/or heat for an adequate period of time. While the sheath after polymerization of the styrene is somewhat more brittle, it has adequate strength to withstand the dimensional changes of the plate or electrode which occur during use.

While the amount of the impregnating solution or monomeric styrene may be varied within wide limits, the maximum amount which can be added is limited by the saturation of the microporous material. However, the amount of the impregnant which remains in the material for polymerization will be dependent to large degree upon other factors now to be described.

Though monomeric styrene evaporates readily at room temperature, after impregnation, loss from the microporous material is at a relatively low rate. However, if the microporous material is saturated with monomeric styrene it will be desirable to remove enough styrene from the material to prevent material decrease in porosity.

The amount of the impregnant, the monomeric styrene, which is evaporated from, and which remains in, the microporous structure may be readily controlled by the time-temperature and ambient conditions to which the microporous material is subjected. Regulation of polymerization of the monomeric styrene also represents a control factor governing the amount of polystyrene produced in the microporous structure. With styrene-saturated material, complete polymerization will result in a structure far too dense for use as a sheathing material in storage batteries.

It is emphasized that the control of polymerization and control of evaporation make possible predetermination of the amount of polystyrene in the microporous structure to enhance its resistance to chemical attack. In one example, after impregnation as by immersion of the dry microporous material into the impregnating solution for ten seconds followed by the exposure to a strong actinic light (the bright summer sun) for a period of three hours, the microporous material changed from a soft mass to a relatively tough material. The resistance to chemical attack of the resultant tough material is enhanced.

There may also be added to the impregnating solution a stabilizer for the polyvinyl chloride, such for example as barium ricinoleate, available on the market under the trade-name "Ferro #121." This stabilizer is advantageous since it is a liquid and is soluble in monomeric styrene. Using such a stabilizer as an additive has the advantage of providing increased protection against degradation of the polyvinyl chloride during application to the impregnated material of the heat and of the actinic light necessary for the polymerization of the monomeric styrene. The stabilizer, since it remains in the microporous material, will be effective continually to enhance the stability of the material against possible degradation of the polyvinyl chloride due to adverse conditions present in its final application.

In a further prefered form of the invention, it is desirable that carbon black be introduced at the time of mixing of the polyvinyl chloride, starch, or other filler, and a temporary plasticizer when needed. By adding the carbon black, further protection of the polyvinyl chloride against degradation due to actinic light is provided since the carbon is, of course, opaque to such light and prevents exposure of the protected polyvinyl chloride. The carbon black also aids the polystyrene in the protection afforded.

What is claimed is:

1. The method of increasing the resistance to chemical atack of microporous polyvinyl chloride which comprises impregnating the microporous material with monomeric styrene in mixture with a catalyst and a wetting agent and polymerizing in situ to polystyrene at least a part of said styrene.

2. The method of increasing ther esistance to chemical attack of microporous polyvinyl chloride which comprises impregnating the microporous material with monomeric styrene and a stabilizer for said material in mixture with a catalyst and a wetting agent and polymerizing in situ to polystyrene at least a part of said styrene.

3. The method of increasing resistance to chemical attack of a thermoplastic microporous material selected from the group consisting of polyvinyl chloride and polyvinylidene chloride which comprises impregnating the microporous material with monomeric styrene in mixture with a catalyst and a wetting agent and polymerizing in situ to polystyrene at least a part of said styrene.

4. The mehod of increasing the resistance to chemical attack of a thermoplastic microporous material selected from the group consisting of polyvinyl chloride and polyvinylidene chloride in the form of a sheath for anodes of batteries which comprises impregnating the microporous material with monomeric styrene in mixture with a catalyst and a wetting agent, polymerizing in situ to polystyrene at least at part of said styrene, and further advancing the polymerization of said monomeric styrene by subjecting the same to sulphuric acid in storage battery operation.

5. A storage battery separator consisting of a thermoplastic resinous body selected from the group consisting of polyvinyl chloride and polyvinylidene chloride and having a plurality of micropores therein, the walls of said micropores being coated with a protective film of polystyrene, said separator being of such porosity after coating as to permit the flow of current and passage of gases therethrough.

6. A storage battery separator consisting of a thermoplastic resinous body of polyvinyl chloride having a plurality of micropores therein, the walls of said micropores being coated with a protective film of polystyrene, said separator being of such porosity after coating as to permit the flow of current and passage of gases therethrough.

References Cited in the file of this patent

UNITED STATES PATENTS

| | | |
|---|---|---|
| 1,463,864 | Bent | Aug. 7, 1923 |
| 2,297,248 | Rudolph | Sept. 29, 1942 |
| 2,322,310 | Muskat et al. | June 22, 1943 |
| 2,501,868 | Hodgdon | Mar. 28, 1950 |

FOREIGN PATENTS

| | | |
|---|---|---|
| 576,657 | Great Britain | Apr. 15, 1946 |